United States Patent
Satake et al.

(10) Patent No.: US 10,250,041 B2
(45) Date of Patent: Apr. 2, 2019

(54) POWER CONTROL SYSTEM, POWER CONTROL DEVICE, AND METHOD FOR CONTROLLING POWER CONTROL SYSTEM

(71) Applicant: KYOCERA Corporation, Kyoto (JP)

(72) Inventors: Masaomi Satake, Yokohama (JP); Tetsuya Takenaka, Yamato (JP)

(73) Assignee: KYOCERA Corporation, Kyoto (JP)

( * ) Notice: Subject to any disclaimer, the term of this patent is extended or adjusted under 35 U.S.C. 154(b) by 319 days.

(21) Appl. No.: 14/785,618

(22) PCT Filed: Apr. 18, 2014

(86) PCT No.: PCT/JP2014/002216
§ 371 (c)(1),
(2) Date: Oct. 19, 2015

(87) PCT Pub. No.: WO2014/171154
PCT Pub. Date: Oct. 23, 2014

(65) Prior Publication Data
US 2016/0064936 A1    Mar. 3, 2016

(30) Foreign Application Priority Data

Apr. 19, 2013    (JP) .................................. 2013-088760

(51) Int. Cl.
*H02J 1/10*        (2006.01)
*H02J 3/06*        (2006.01)
(Continued)

(52) U.S. Cl.
CPC ............... *H02J 3/383* (2013.01); *H02J 3/32* (2013.01); *H02J 3/387* (2013.01); *H02J 7/35* (2013.01);
(Continued)

(58) Field of Classification Search
CPC .... H02J 3/383; H02J 3/387; H02J 7/35; H02J 3/32; H02J 2003/388; Y02E 10/563; Y02E 10/566; Y02E 70/30
(Continued)

(56) References Cited

U.S. PATENT DOCUMENTS

| | | | |
|---|---|---|---|
| 6,362,540 B1* | 3/2002 | Hill | H02J 1/10 307/24 |
| 8,810,066 B2* | 8/2014 | Moon | H02J 3/32 307/65 |

(Continued)

FOREIGN PATENT DOCUMENTS

| | | |
|---|---|---|
| JP | H09-051638 A | 2/1997 |
| JP | 2007-028735 A | 2/2007 |

(Continued)

OTHER PUBLICATIONS

Extended European search report dated Sep. 30, 2016 by the European Patent Office for counterpart European Patent Application No. 14 78 4971.5.

(Continued)

*Primary Examiner* — Richard Tan
(74) *Attorney, Agent, or Firm* — Procopio Cory Hargreaves and Savitch LLP (57) ABSTRACT

This system can manage efficient operation control among distributed power sources without impairing their versatility. This power control system includes distributed power sources including a storage cell (12) and a power generation device (33) that generates power while a current sensor (40) detects forward power flow, and a power control device (20) including a first power converter (21) that converts AC power from a commercial power grid to DC power and supplies the DC power to the storage cell (12) during an interconnected operation, a supply unit that supplies power generated by the power generation device (33) to the storage (Continued)

cell (12) during an independent operation, and an independent operation switch (24) opened during the interconnected operation and closed during the independent operation to cause output from the first power converter (21) to flow in a forward power flow direction through the current sensor (40).

8 Claims, 5 Drawing Sheets

(51) Int. Cl.
*H02J 3/46* (2006.01)
*H02J 3/38* (2006.01)
*H02J 3/32* (2006.01)
*H02J 7/35* (2006.01)

(52) U.S. Cl.
CPC ....... *H02J 2003/388* (2013.01); *Y02E 10/563* (2013.01); *Y02E 10/566* (2013.01); *Y02E 70/30* (2013.01)

(58) Field of Classification Search
USPC .............................................. 307/19, 20, 21
See application file for complete search history.

(56) References Cited

U.S. PATENT DOCUMENTS

| | | | |
|---|---|---|---|
| 2011/0175565 A1* | 7/2011 | Lee | H01M 10/465 320/101 |
| 2011/0291606 A1* | 12/2011 | Lee | B60L 11/182 320/101 |
| 2012/0283890 A1* | 11/2012 | Fu | H02J 3/14 700/295 |
| 2014/0152097 A1 | 6/2014 | Kitaji | |

FOREIGN PATENT DOCUMENTS

| | | |
|---|---|---|
| JP | 2007-049770 A | 2/2007 |
| JP | 2008-253033 A | 10/2008 |
| WO | 2008-041311 A1 | 4/2008 |
| WO | 2012-165365 A1 | 12/2012 |
| WO | 2013/015374 A1 | 1/2013 |

OTHER PUBLICATIONS

International Search Report dated May 27, 2014, issued for International Application No. PCT/JP2014/002216.
Written Opinion of the International Searching Authority issued by Japan Patent Office for International Application No. PCT/JP2014/002216.

* cited by examiner

POWER CONTROL SYSTEM, POWER CONTROL DEVICE, AND METHOD FOR CONTROLLING POWER CONTROL SYSTEM

CROSS-REFERENCE TO RELATED APPLICATION

This application claims priority to and the benefit of Japanese Patent Application No. 2013-088760 filed Apr. 19, 2013, the entire contents of which are incorporated herein by reference.

TECHNICAL FIELD

This disclosure relates to a power control system, a power control device, and a method for controlling a power control system.

BACKGROUND

As a power control device for power generation in a power generation system that includes power generating equipment, such as a photovoltaic panel or the like, known devices allow grid interconnected operation that outputs AC power while interconnected with a commercial power grid (abbreviated below as "grid" as appropriate) and independent operation that outputs AC power irrespective of the grid Also, as a power control device for power storing in a power storing system that includes power storing equipment, such as a storage cell or the like that is charged by the power grid, known devices allow grid interconnected operation that outputs AC power while interconnected with the grid and independent operation that outputs AC power irrespective of the grid, like the above-described power control device for power generation.

SUMMARY

Technical Problem

Power control systems are required to integrally manage and operate a plurality of distributed power sources, such as photovoltaic cells, storage cells, fuel cells, gas powered generators, and the like. There is particular demand for the construction of a system that can manage efficient operation control among a plurality of distributed power sources without impairing the versatility of the distributed power sources.

It would therefore be helpful to provide a power control system, a power control device, and a method for controlling a power control system that can manage efficient operation control among a plurality of distributed power sources without impairing the versatility of the distributed power sources.

Solution to Problem

In order to resolve the above problem, a power control system according to this disclosure includes a plurality of distributed power sources that include a storage cell and a power generation device that generates power while a current sensor detects forward power flow and includes:

a power control device including a first power converter configured to convert AC power from a commercial power grid to DC power and supply the DC power to the storage cell during an interconnected operation, and a supply unit configured to supply power generated by the power generation device to the storage cell during an independent operation; and an independent operation switch opened during the interconnected operation and closed during the independent operation to cause output from the first power converter to flow in a forward power flow direction through the current sensor.

The power control system may further include an interconnected operation switch closed during the interconnected operation to cause output from the commercial power grid or output from the first power converter to flow in a forward power flow direction through the current sensor, such that the interconnected operation switch and the independent operation switch are synchronously switched.

The supply unit may include a second power converter configured to convert AC power generated by the power generation device to DC power and supply the DC power to the storage cell.

The second power converter may be a converter that removes a DC component of current.

The power control system may further include a controller configured to control a supply of power generated by the power generation device to the storage cell in accordance with output current at a commercial power grid side of the first power converter.

During the independent operation, the power control device may cause the storage cell to charge with power from the power generation device via the supply unit from a time when output from the first power converter on the commercial power grid side reaches zero until the output is produced again.

Furthermore, in order to solve the above problem, a power control device according to this disclosure is used in a power control system that includes a plurality of distributed power sources including a storage cell and a power generation device that generates power while a current sensor detects forward power flow, and the power control device includes:

a first power converter configured to perform AC/DC conversion between a commercial power grid and the storage cell during an interconnected operation;

a supply unit configured to supply power generated by the power generation device to the storage cell during an independent operation; and an independent operation switch opened during the interconnected operation and closed during the independent operation to cause output from the first power converter to flow in a forward power flow direction through the current sensor.

Furthermore, in order to solve the above problem, a method according to this disclosure is for controlling a power control system that includes a plurality of distributed power sources including a storage cell and a power generation device that generates power while a current sensor detects forward power flow, and a first power converter configured to convert AC power from a commercial power grid to DC power and supply the DC power to the storage cell during an interconnected operation, and the method includes:

generating power with the power generation device during an independent operation;

supplying the power generated by the power generation device to the storage cell with the first power converter; and causing output from the first power converter to flow in a forward power flow direction through the current sensor during the independent operation.

Advantageous Effect

According to this power control system, power control device, and method for controlling a power control system, it is possible to manage efficient operation control among a plurality of distributed power sources without impairing the versatility of the distributed power sources.

DETAILED DESCRIPTION

With reference to the drawings, the following describes the disclosed embodiments in detail.

Embodiment

First, a power control system according to one of the disclosed embodiments is described. In addition to power supplied by the grid (commercial power grid), the power control system of this embodiment includes a distributed power source that supplies sellable power and/or a distributed power source that supplies unsellable power. The distributed power source that supplies sellable power is, for example, a system that supplies power by photovoltaic power generation or the like. On the other hand, the distributed power source that supplies unsellable power is, for example, a storage cell system that can charge and discharge power, a fuel cell system that includes a fuel cell such as a Solid Oxide Fuel Cell (SOFC), a gas powered generator system that generates power with gas fuel, or the like. This embodiment illustrates an example of providing a photovoltaic cell as a distributed power source that supplies sellable power and providing a storage cell and a power generation device, which is a fuel cell or a gas powered generator, as distributed power sources that supply unsellable power.

Figure 1:
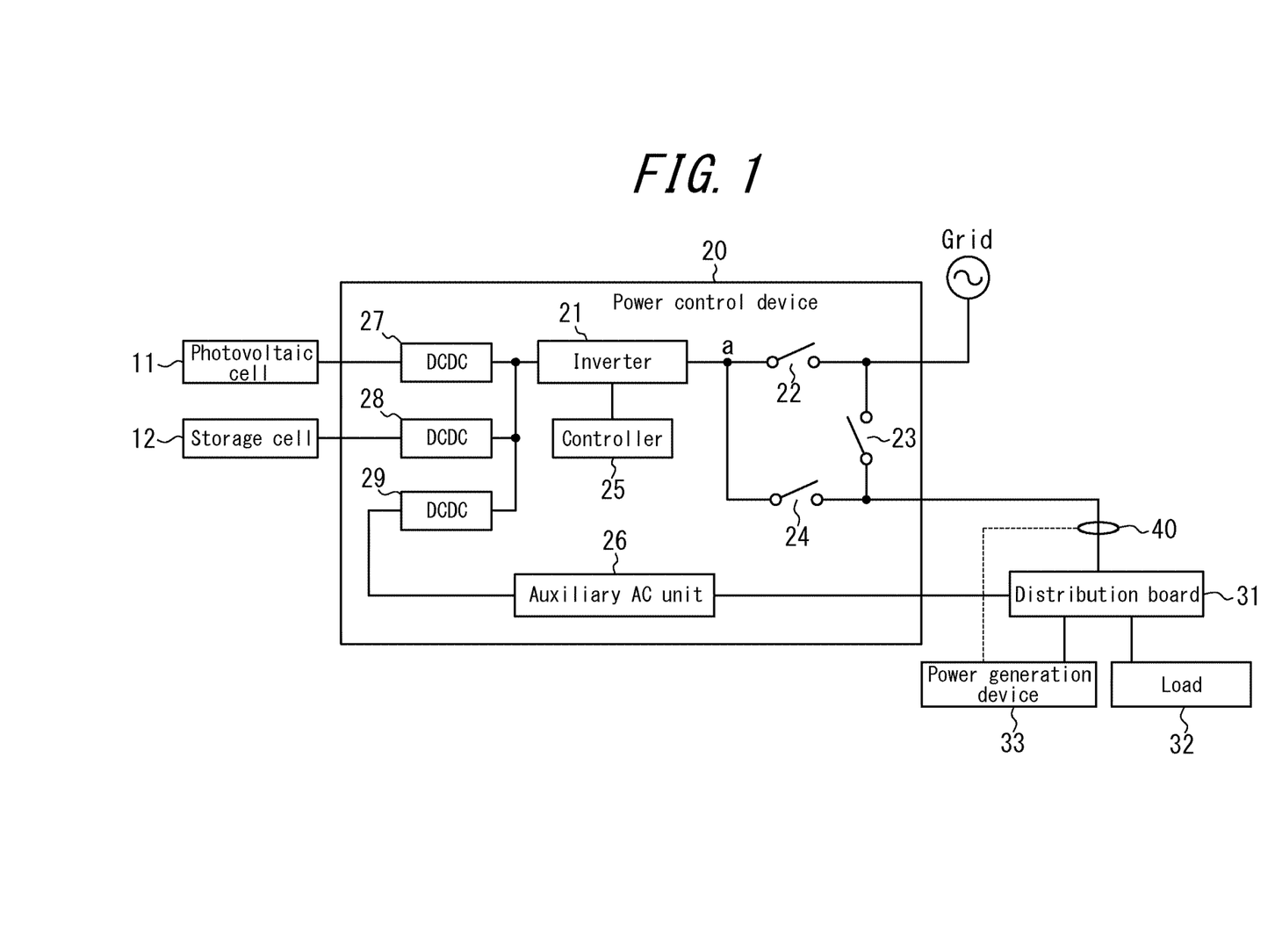
FIG. 1 is a block diagram of a power control system according to one of the disclosed embodiments.

FIG. 1 is a block diagram schematically illustrating the structure of a power control system according to one of the disclosed embodiments. The power control system of this embodiment includes a photovoltaic cell 11, storage cell 12, power control device 20, distribution board 31, load 32, power generation device 33, and current sensor 40. The power generation device 33 is configured with a fuel cell or gas powered generator. The power control system normally performs interconnected operation with the grid and supplies power supplied by the grid and power from the distributed power sources (photovoltaic cell 11, storage cell 12, and power generation device 33) to the load 32. When there is no power supply from the grid, such as during a power outage, the power control system performs independent operation and supplies power from the distributed power sources (photovoltaic cell 11, storage cell 12, and power generation device 33) to the load 32. When the power control system performs independent operation, the distributed power sources (photovoltaic cell 11, storage cell 12, and power generation device 33) are disconnected from the grid. When the power control system performs interconnected operation, the distributed power sources (photovoltaic cell 11, storage cell 12, and power generation device 33) are connected to the grid.

In FIG. 1, the solid lines connecting functional blocks represent wiring through which power flows, and the dashed line connecting functional blocks represents the flow of control signals or of communicated information. The communication indicated by the dashed line may be wired communication or wireless communication. A variety of methods, including a hierarchical structure, may be employed for control signals and communication of information. For example, a short distance communication method such as ZigBee® or the like may be used. Furthermore, a variety of transmission media may be used, such as infrared communication, Power Line Communication (PLC), or the like. Above the lower layers that include the physical layers appropriate for each type of communication, a variety of communication protocols prescribed only for logical layers, such as ZigBee SEP2.0 (Smart Energy Profile 2.0), ECHONET Lite®, or the like, may be used.

The photovoltaic cell 11 converts photovoltaic energy into DC power. In the photovoltaic cell 11, for example power generation units that have a photoelectric conversion cell are connected in a matrix and output a predetermined short-circuit current (for example, 10 A). The photovoltaic cell 11 may be of any type capable of photoelectric conversion, such as a silicon-based polycrystalline photovoltaic cell, a silicon-based monocrystalline photovoltaic cell, a CIGS or other thin-film photovoltaic cell, or the like.

The storage cell 12 is configured with a storage cell such as a lithium-ion cell, a nickel-hydrogen cell, or the like. The storage cell 12 can supply power by discharging the power charged in the storage cell 12. In addition to the power supplied by the grid and the photovoltaic cell 11, the storage cell 12 can also be charged with power supplied by the power generation device 33, as described below.

The power control device 20 converts the DC power supplied by the photovoltaic cell 11 and the storage cell 12 and the AC power supplied by the grid and the power generation device 33 and also performs control to switch between interconnected operation and independent operation. The power control device 20 includes an inverter 21 (first power converter), interconnected operation switches 22 and 23, an independent operation switch 24, an auxiliary AC unit 26 (second power converter), DCDC units 27 to 29, and a controller 25 that controls the entire power control device 20. The interconnected operation switch 23 may be configured to be outside the power control device 20.

The DCDC units 27 to 29 raise or lower the voltage of the DC power at a stage prior to the inverter 21. For example, the DCDC unit 27 raises the voltage of the DC power from the photovoltaic cell 11 to a certain voltage and supplies the result to the inverter 21. The DCDC unit 28 raises the voltage of the DC power from the storage cell 12 to a certain voltage and supplies the result to the inverter 21. The DCDC unit 28 also lowers the voltage of DC current from the inverter 21, DCDC unit 27, or DCDC unit 29 and supplies the result to the storage cell. As described below, the DCDC unit 29 is for drawing power from the power generation device 33 through the auxiliary AC unit 26.

The inverter 21 (first power converter) is a two-way inverter that converts the DC power supplied by the photovoltaic cell 11 and the storage cell 12 into AC power and converts the AC power supplied by the grid into DC power.

The interconnected operation switches 22 and 23 and the independent operation switch 24 are configured with relays, transistors, and the like and are controlled to be on or off. As illustrated, the independent operation switch 24 is provided between the power generation device 33 and the storage cell 12. The interconnected operation switches 22 and 23 and the independent operation switch 24 are switched in synchronization so that both are not on (or off) simultaneously. In greater detail, when the interconnected operation switches 22 and 23 are on, the independent operation switch 24 is synchronously off, and when the interconnected operation switches 22 and 23 are off, the independent operation switch 24 is synchronously on. Synchronous control of the interconnected operation switches 22 and 23 and the independent operation switch 24 is implemented with hardware by having the wiring for the control signal to the interconnected operation switches 22 and 23 branch to the independent operation switch 24. For each switch, the on and off states may of course be set separately for the same control signal. The synchronization control of the interconnected operation switches 22 and 23 and the independent operation switch 24 may also be implemented with software by the controller 25.

The auxiliary AC unit 26 (second power converter) converts AC power yielded by power generation by the power generation device 33 into DC power and supplies the DC power to the storage cell 12. The auxiliary AC unit 26 constitutes a supply unit that supplies power generated by the power generation device 33 during independent operation to the storage cell 12. The auxiliary AC unit 26 may also be provided external to the power control device 20. In this case, as the supply unit, the power control device 20 includes an input terminal that receives input of DC power from the external auxiliary AC unit. The auxiliary AC unit 26 is preferably configured to remove the DC component of current flowing through the circuit. This is to prevent adverse effects, during independent operation, due to a DC component remaining in the system that includes the independent operation switch 24 and the auxiliary AC unit 26. Detailed structural examples of the auxiliary AC unit 26 are described below.

The controller 25 is, for example, configured with a microcomputer and controls operations of the inverter 21, interconnected operation switches 22 and 23, independent operation switch 24, auxiliary AC unit 26, DCDC units 27 to 29, and the like based on conditions such as an increase in grid voltage, a power outage, or the like. During interconnected operation, the controller 25 switches the interconnected operation switches 22 and 23 on and the independent operation switch 24 off. During independent operation, the controller 25 switches the interconnected operation switches 22 and 23 off and the independent operation switch 24 on.

During interconnected operation, the distribution board 31 divides power supplied by the grid into a plurality of branches for distribution to the load 32. The distribution board 31 also divides power supplied by the plurality of distributed power sources (photovoltaic cell 11, storage cell 12, and power generation device 33) into a plurality of branches for distribution to the load 32. The load 32 is a power load that consumes power. Examples include electrical appliances used in the home, such as an air conditioner, microwave oven, or television; machines and lighting used in industrial and commercial facilities, such as air conditioning equipment, lighting fixtures, and the like.

The power generation device 33 is configured with a fuel cell or gas powered generator. The fuel cell includes a cell that uses hydrogen to generate DC power via a chemical reaction with oxygen in the air, an inverter that converts the generated DC power into 100 V or 200 V AC power, and auxiliary components. Here, the fuel cell that is the power generation device 33 is a system that can provide AC power to the load 32 without passing through the power control device 20. Accordingly, the fuel cell is not necessarily designed by assuming connection with the power control device 20 and may be a versatile system. The gas powered generator generates power with an engine that uses a predetermined gas or the like as fuel.

The power generation device 33 generates power while the corresponding current sensor 40 detects forward power flow (current in the power buying direction), and when generating power, performs a load following operation to follow the power consumption of the load 32 or a rated operation at a predetermined rated power. The load following range during the load following operation is, for example, 200 W to 700 W, and the rated power during rated operation is, for example, 700 W. The power generation device 33 may perform a load following operation to follow the power consumption of the load 32 during interconnected operation (for example, 200 W to 700 W) and perform a load following operation or a rated operation at a rated power during independent operation.

The current sensor 40 detects current flowing between the grid and the power generation device 33. In Japan, power generated by the power generation device 33 is prescribed as being unsellable. Therefore, when the current sensor 40 detects reverse power flow (current in the power selling direction), the power generation device 33 stops generating power. While the current sensor 40 detects forward power flow, the power generation device 33 can supply its own power to the load 32 and generates power by a load following operation or a rated operation.

The power control system of this embodiment can store the power generated by the power generation device 33 in the storage cell 12 via the auxiliary AC unit 26 during independent operation. The following describes storage in the storage cell 12 via the auxiliary AC unit 26 in detail.

Figure 2:
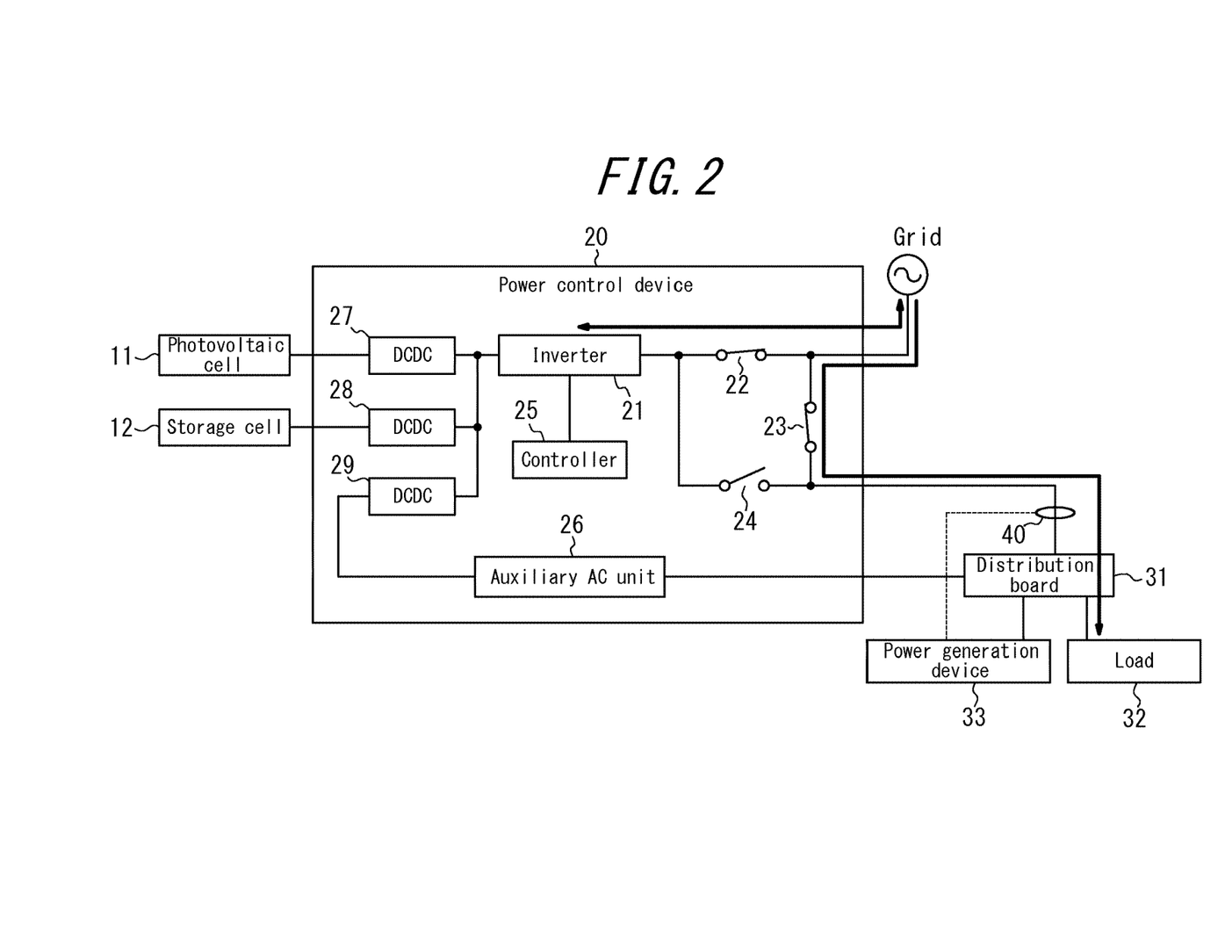
FIG. 2 illustrates an example of control in the power control system during interconnected operation.

FIG. 2 illustrates an example of control in the power control system during interconnected operation. In this case, the switches in the power control device 20 are controlled so that the interconnected operation switches 22 and 23 are on, and the independent operation switch 24 is off.

During interconnected operation, as indicated by the bold arrow, AC power at 100 V (or 200 V) is supplied by the grid and fed to the load 32. When charging of the storage cell 12 is not complete, the power control device 20 converts the AC power from the grid to DC power and charges the storage cell 12. The power control device 20 can convert the power generated by the photovoltaic cell 11 into AC power and send the AC power to the grid by reverse power flow and can also sell surplus power. The power control device 20 may also output the power from the grid and the power from the distributed power sources (photovoltaic cell 11 and storage cell 12) to the load 32. In this case, forward power flow from the grid (current in the power buying direction) flows into the current sensor 40, and therefore, the power generation device 33 generates power and supplies the power to the load 32 through the distribution board 31.

Next, examples of control in the power control system during independent operation are described with reference to FIGS. 3 and 4. In this case, the switches in the power control device 20 are controlled so that the interconnected operation switches 22 and 23 are off, and the independent operation switch 24 is on.

Figure 3:
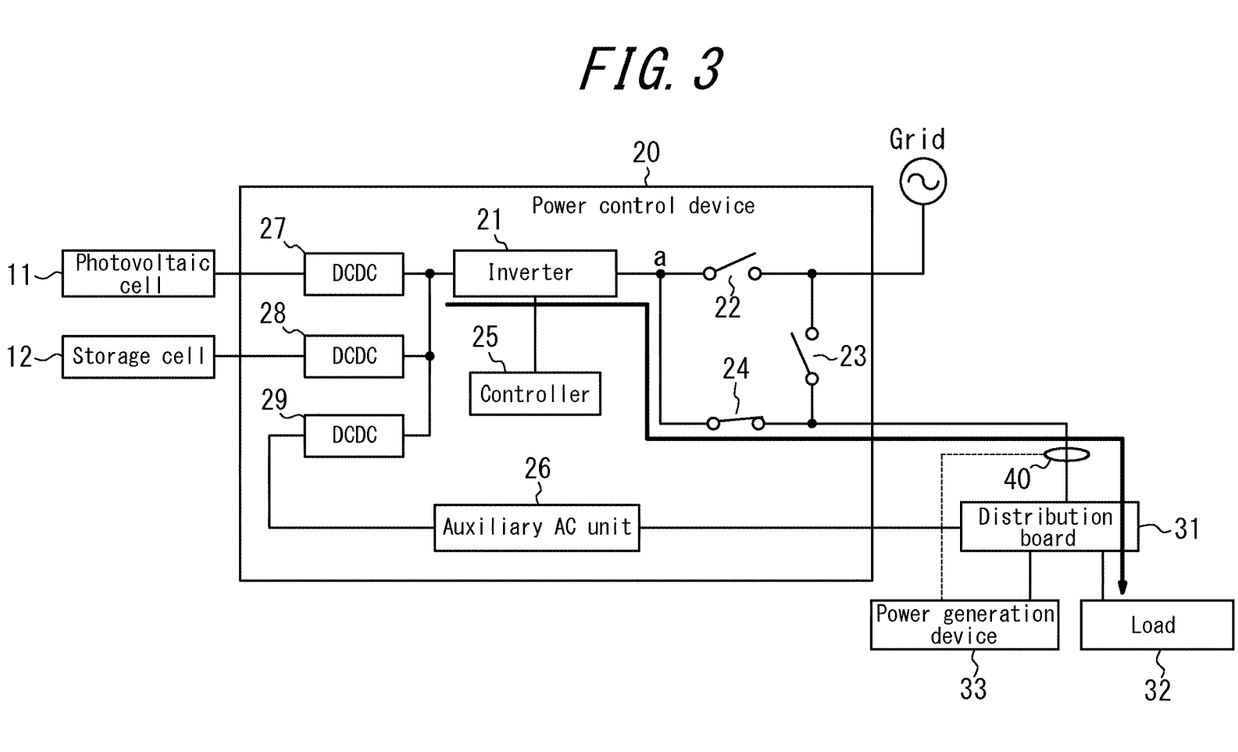
FIG. 3 illustrates an example of control in the power control system during independent operation.

FIG. 3 illustrates power supply by the distributed power sources during independent operation. During independent operation, the power of the distributed power sources (photovoltaic cell 11 and storage cell 12) is supplied by the power control device 20 to the load 32 via the independent operation switch 24.

Figure 4:
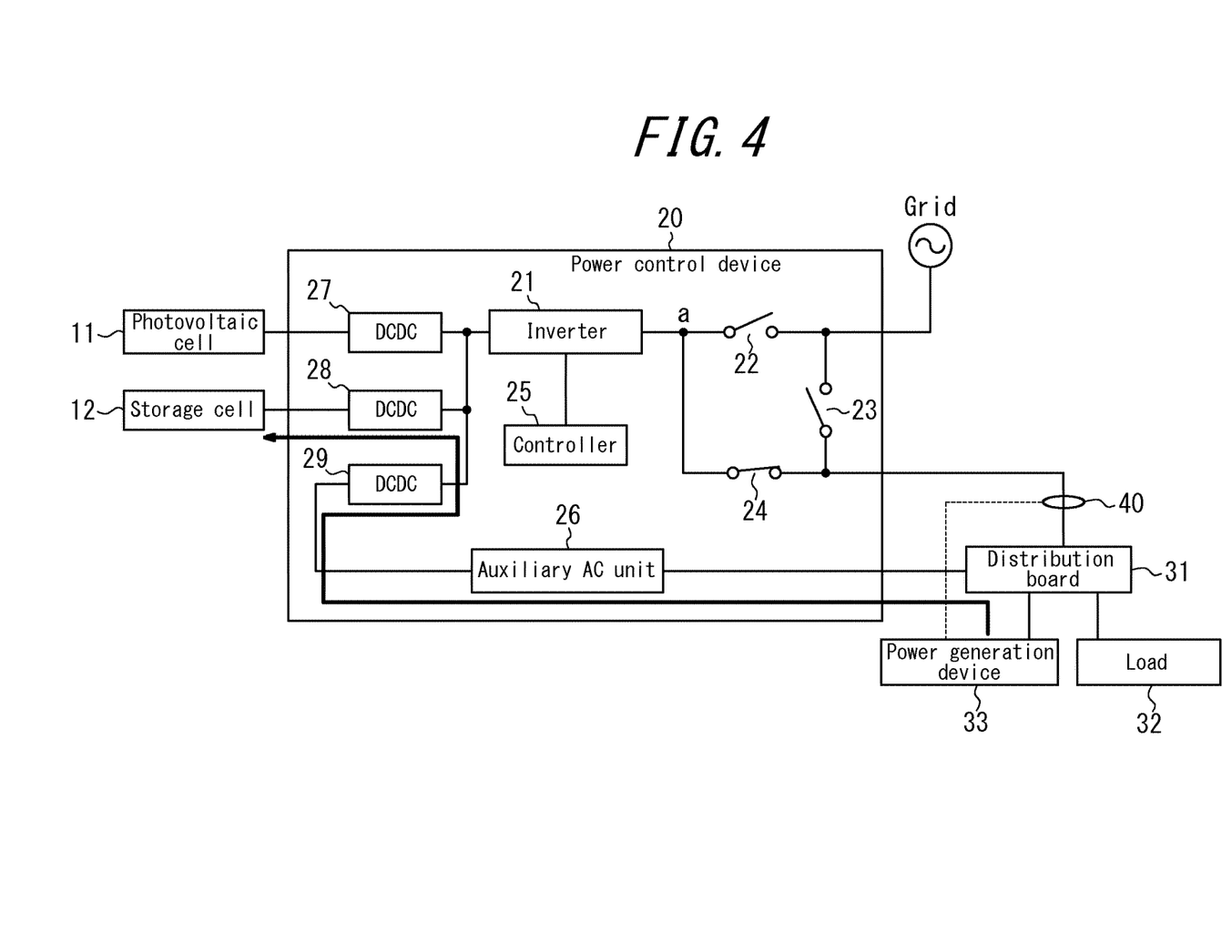
FIG. 4 illustrates an example of control in the power control system during independent operation.

FIG. 4 illustrates power generation by the power generation device 33 during independent operation. As illustrated in FIG. 3, during independent operation, power is supplied to the load 32 by the power control device 20. At this time, since the current sensor 40 detects forward power flow (current in the power buying direction), the power generation device 33 generates power with a load following operation. The distribution board 31 supplies the power generated by the power generation device 33 to the load 32 and supplies surplus power that exceeds the power consumed by the load 32 to the auxiliary AC unit 26 of the power control device 20. The surplus power is converted to DC power by the auxiliary AC unit 26 and fed to the storage cell 12.

At this time, in the power control device 20, the controller 25 can for example control a DCDC converter provided in the DCDC unit 29 to control the amount of power drawn from the power generation device 33. The controller 25 can control the amount of power drawn by detecting the current at point a (the grid-side output of the inverter 21) in the power control device 20. With reference to FIGS. 3 and 4, operations for adjustment of the amount of power are described using an example in which the power consumed by the load 32 is 400 W.

<Start of Independent Operation>

Initially, operation of the power generation device 33 is assumed to be suspended. First, upon the interconnected operation switches 22 and 23 being turned off (open), and the independent operation switch 24 being turned on (closed) in synchronization, independent operation of the power control device 20 begins using the distributed power sources (photovoltaic cell 11 and storage cell 12). At this time, output from the inverter 21 passes through the independent operation switch 24 and further through the distribution board 31 to be supplied to the load 32. At point a, the controller 25 can detect current corresponding to the power consumption of 400 W. Current arriving from the distributed power sources via the inverter 21 flows through the current sensor 40, and the current sensor 40 detects forward power flow. Therefore, the power generation device 33 begins to operate.

<Start of Operation of Fuel Cell>

At the start of operation, the power generation device 33 performs a load following operation to output the power (400 W) necessary for the load 32. Subsequently, output of the power generation device 33 gradually increases, and once the power necessary for the load 32 can be supplied by a load following operation, power ceases to be supplied by the distributed power sources via the inverter 21. At this time, the power flowing through point a becomes zero.

<Start of Charging of the Storage Cell>

When the current flowing through point a reaches zero, the controller 25 begins to draw power with the auxiliary AC unit 26 and the DCDC unit 29. In greater detail, the controller 25 begins control to charge the storage cell 12 with power output by the power generation device 33 through the auxiliary AC unit 26 and the DCDC unit 29. Here, the storage cell 12 discharges power or is suspended from immediately after the start of independent operation until output from the power generation device 33 reaches 400 W. Therefore, the charging and discharging circuit is first changed to a charging state.

<Drawing of Power>

Next, the controller 25 gradually increases the charging current to the charging and discharging circuit of the storage cell 12. By increasing the charging current, the amount of power that is drawn gradually increases, and output of the power generation device 33 is raised to reach rated output.

<Adjustment of Amount Drawn>

At this time, among the rated output of 700 W, the 300 W that exceed the 400 W of power consumed by the load 32 are drawn into the DCDC unit 29 via the auxiliary AC unit 26 and stored in the storage cell 12. The charging and discharging circuit is not, however, fixed at a drawn amount of 300 W, and the amount of power drawn continues to increase even if power exceeds 300 W. In the case that power exceeding 300 W is drawn, a lack of power then occurs in the load 32, since the power generation device 33 has reached its rated output. At this time, the lacking power once again appears as output from the inverter 21. In other words, if the power drawn by the charging and discharging circuit increases excessively, current once again begins to appear at point a.

At this time, after the current at point a reaches zero and power drawing begins, the controller 25 controls the charging and discharging circuit at the point at which current again begins to flow through point a so as to reduce the charging current to the storage cell 12, thereby limiting the amount of power drawn by the DCDC unit 29. Once the power drawn by the DCDC unit 29 falls below 300 W as a result of gradually lowering the amount of power drawn, the current at point a once again ceases to be observed.

Subsequently, once the current at point a reaches zero, the controller 25 controls the charging current to increase until current is once again observed at point a. Upon current being observed at point a, the controller 25 then repeats control to reduce the charging current until the current at point a once again reaches zero. Subsequently, the controller 25 stops control to draw power upon detecting that the storage cell 12 is completely charged. Drawing of power from the power generation device 33 thus ceases, and the power is reduced until reaching a value corresponding to the power required by the load 32.

As a result of this control, only the remainder after subtracting the power consumed by the load 32 from the power of the power generation device 33 is supplied to the storage cell 12. Stating that the current reaches zero means that the current falls below a predetermined value and is not limited to the case of strictly reaching zero. So that processing does not oscillate between starting and stopping the drawing of power, the controller 25 may independently set a threshold for starting to draw power and a threshold for ceasing to draw power, for example by providing hysteresis. A stable state is thus maintained between charging of the storage cell 12, consumption by the load 32, and rated output of the fuel cell.

A secondary effect is also achieved by this adjustment of the charging current based on control that observes point a. In other words, this control follows the load, and therefore if the power consumed by the load 32 fluctuates, the charging current is adjusted as a result. Hence, output of the power generation device 33 can effectively and stably be controlled without the need for complex control. Carrying this logic to the extreme, the controller 25 need not even know what the rated output of the power generation device 33 is. Accordingly, a fuel cell especially designed to be the power generation device 33 is unnecessary, and a complicated interface for inputting information on performance into the controller 25 is also unnecessary. Hence, versatility can be secured. In other words, optimal conditions can be maintained.

According to this embodiment, the auxiliary AC unit 26 of the power control device 20 thus converts AC power generated by the power generation device 33 during independent operation into DC power and supplies the DC power to the storage cell 12. The independent operation switch 24 is closed during independent operation so as to pass power from the inverter 21 to the current sensor 40 in the forward power flow direction. As a result, it is possible to manage efficient operation control among a plurality of distributed power sources without impairing the versatility of the distributed power sources. In greater detail, during independent operation, it is possible to store the power generated by the power generation device 33 in the storage cell 12 via the auxiliary AC unit 26. This embodiment also offers the advantage that a general-purpose fuel cell system and gas power generation system may be used without the need to make any special changes to the power generation device 33 itself.

According to this embodiment, the interconnected operation switches 22 and 23 and the independent operation switch 24 are switched in synchronization. In greater detail, when the interconnected operation switches 22 and 23 are on, the independent operation switch 24 is synchronously off, and when the interconnected operation switches 22 and 23 are off, the independent operation switch 24 is synchronously on. Both sets of switches are thus prevented from being on or off simultaneously, and interconnected operation and independent operation can be switched between safely.

According to this embodiment, the power control device 20 includes, as the supply unit, the auxiliary AC unit 26 that converts AC power generated by the power generation device 33 into DC power and supplies the DC power to the storage cell 12. In this way, a power generation device that outputs AC power can be connected directly to the power control device.

Figure 5:
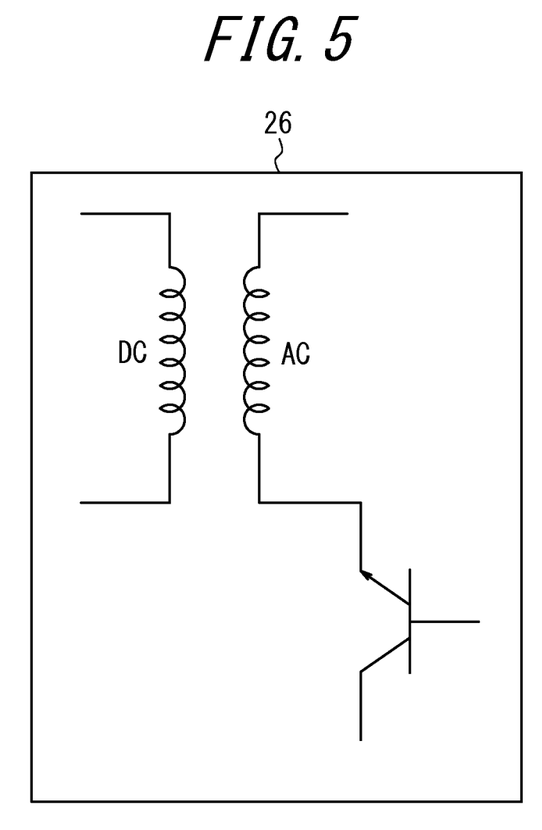
FIG. 5 illustrates an example of the structure of an auxiliary AC unit.

As described above, the auxiliary AC unit 26 is preferably a converter that is configured to remove the DC component of current flowing through the circuit. This is to prevent adverse effects, during independent operation, due to a DC component remaining in the system that includes the independent operation switch 24 and the auxiliary AC unit 26. FIG. 5 illustrates an example of the structure of the auxiliary AC unit 26. As illustrated in FIG. 5, it is possible to implement an ACDC converter that removes the DC component of current by having the transformer on the DC side and the transformer on the AC side face each other and by switching the AC side with a switching element such as a transistor.

According to this embodiment, in the power control device 20, the controller 25 controls supply of the power generated by the power generation device 33 to the storage cell 12 in accordance with the output current at the grid side of the inverter 21. It thus becomes possible to switch control by monitoring the current at one point, thereby avoiding a control load or fluctuation in the control state due to monitoring the current at multiple points. Notably, during independent operation, the power control device 20 may cause the storage cell 12 to charge with power from the power generation device 33 via the supply unit from the time when the output from the inverter 21 on the grid side reaches zero until the output is produced again.

Much of the subject matter in this disclosure is indicated as a series of operations executed either by a computer system that can execute program instructions or by other hardware. Examples of a computer system and other hardware include a versatile computer, a personal computer (PC), a dedicated computer, a workstation, a Personal Communications System (PCS), a cellular phone, a cellular phone provided with a data processing function, an RFID receiver, a game console, an electronic notepad, a laptop computer, a Global Positioning System (GPS) receiver, or other programmable data processing device. In one embodiment, a variety of operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of a microprocessor, central processing unit (CPU), Application Specific Integrated Circuit (ASIC), Digital Signal Processor (DSP), Programmable Logic Device (PLD), Field Programmable Gate Array (FPGA), processor, controller, microcontroller, microprocessor, electronic device, other device designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

While the disclosed system has a variety of modules and/or units for implementing particular functions, these modules and units have only been indicated schematically in order to briefly illustrate the functionality thereof. It should be noted that no particular hardware and/or software is indicated. In this sense, it suffices for the modules, units, and other constituent elements to be hardware and/or software implemented so as to substantially execute the particular functions described here. The various functions or different constituent elements may be combined with or separated from hardware and/or software in any way, and each may be used individually or in some combination. An input/output (I/O) device or user interface including, but not limited to, a keyboard, display, touchscreen, pointing device, or the like may be connected to the system directly or via an I/O controller. In this way, the various subject matter disclosed herein may be embodied in a variety of forms, and all such embodiments are included in the scope of the subject matter in this disclosure.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the members, units, steps, and the like may be reordered in any logically consistent way. Furthermore, units, steps, and the like may be combined into one or divided.

REFERENCE SIGNS LIST

11 Photovoltaic cell
12 Storage cell
20 Power control device
21 Inverter (first power converter)
22, 23 Interconnected operation switch
24 Independent operation switch
25 Controller
26 Auxiliary AC unit (second power converter)
27, 28, 29 DCDC unit
31 Distribution board
32 Load
33 Power generation device
40 Current sensor

The invention claimed is:

1. A power control system comprising:
a storage cell;
a power generation device that generates power while a current sensor detects forward power flow; and
a power control device including
a first power converter configured to convert AC power from a commercial power grid to DC power and supply the DC power to the storage cell during an interconnected operation, and
a supply unit configured to supply power generated by the power generation device to the storage cell during an independent operation;
an independent operation switch opened during the interconnected operation and closed during the independent operation to cause output from the first power converter to flow in a direction of the forward power flow through the current sensor; and
an interconnected operation switch that is open during the independent operation to prevent output from the commercial power grid to flow in the direction of the forward power flow through the current sensor,
wherein the first power converter is a single device and is a two-way inverter,
wherein a first input/output unit of the first power converter is connected to the storage cell, and
wherein a second input/output unit of the first power converter is connected to the commercial power grid via the interconnected operation switch and is connected to the current sensor via the independent operation switch.

2. The power control system of claim 1, wherein the interconnected operation switch is closed during the interconnected operation to cause output from the commercial power grid or output from the first power converter to flow in the direction of the forward power flow through the current sensor, and wherein the interconnected operation switch and the independent operation switch are synchronously switched.

3. The power control system of claim 1, wherein the supply unit includes a second power converter configured to convert AC power generated by the power generation device to DC power and supply the DC power to the storage cell.

4. The power control system of claim 3, wherein the second power converter is a converter that removes a DC component of current.

5. The power control system of claim 1, further comprising a controller configured to control a supply of power generated by the power generation device to the storage cell in accordance with output current at a commercial power grid side of the first power converter.

6. The power control system of claim 5, wherein during the independent operation, the power control device causes the storage cell to charge with power from the power generation device via the supply unit from a time when output from the first power converter on the commercial power grid side reaches zero until the output is produced again.

7. A power control device used in a power control system that includes a plurality of distributed power sources including a storage cell and a power generation device that generates power while a current sensor detects forward power flow, the power control device comprising:
a first power converter configured to perform AC/DC conversion between a commercial power grid and the storage cell during an interconnected operation;
a supply unit configured to supply power generated by the power generation device to the storage cell during an independent operation;
an independent operation switch opened during the interconnected operation and closed during the independent operation to cause output from the first power converter to flow in a direction of the forward power flow through the current sensor; and
an interconnected operation switch that is open during the independent operation to prevent output from the commercial power grid to flow in the direction of the forward power flow through the current sensor,
wherein the first power converter is a single device and is a two-way inverter,
wherein a first input/output unit of the first power converter is connected to the storage cell, and
wherein a second input/output unit of the first power converter is connected to the commercial power grid via the interconnected operation switch and is connected to the current sensor via the independent operation switch.

8. A method for controlling a power control system that includes a plurality of distributed power sources including a storage cell and a power generation device that generates power while a current sensor detects forward power flow, and a first power converter configured to perform AC/DC conversion between a commercial power grid and the storage cell during an interconnected operation, wherein the first power converter is a single device and is a two-way inverter, wherein a first input/output unit of the first power converter is connected to the storage cell, wherein a second input/output unit of the first power converter is connected to the commercial power grid via an interconnected operation switch and is connected to the current sensor via an independent operation switch, wherein the independent operation switch is opened during the interconnected operation and is closed during an independent operation, and wherein the interconnected operation switch is opened during the independent operation and is closed during the interconnected operation, the method comprising:
supplying power from the commercial power grid to the storage cell via the interconnected operation switch during the interconnected operation;
generating power with the power generation device while the current sensor detects the forward power flow during the independent operation;
supplying the power generated by the power generation device to the storage cell;
causing output from the storage cell to flow in a direction of the forward power flow through the independent operation switch and the current sensor during the independent operation; and preventing output from the commercial power grid from flowing in the direction of the forward power flow through the current sensor during the independent operation.

\* \* \* \* \*